(12) United States Patent
Brühlmeier et al.

(10) Patent No.: US 12,517,235 B2
(45) Date of Patent: Jan. 6, 2026

(54) CALIBRATION COURSES AND TARGETS

(71) Applicant: Motional AD LLC, Boston, MA (US)

(72) Inventors: Marius Lukas Brühlmeier, Singapore (SG); Aaron Low Weng Soon, Singapore (SG); Huy Dinh Nguyen, Singapore (SG)

(73) Assignee: Motional AD LLC, Bostson (MA)

( * ) Notice: Subject to any disclaimer, the term of this patent is extended or adjusted under 35 U.S.C. 154(b) by 1116 days.

(21) Appl. No.: 17/448,451

(22) Filed: Sep. 22, 2021

(65) Prior Publication Data

US 2023/0088398 A1    Mar. 23, 2023

(51) Int. Cl.
| | |
|---|---|
| *G01S 7/497* | (2006.01) |
| *G01S 13/89* | (2006.01) |
| *G01S 13/931* | (2020.01) |
| *G01S 17/89* | (2020.01) |
| *G01S 17/931* | (2020.01) |
| *B60W 50/00* | (2006.01) |

(52) U.S. Cl.
CPC .............. *G01S 7/497* (2013.01); *G01S 13/89* (2013.01); *G01S 13/931* (2013.01); *G01S 17/89* (2013.01); *G01S 17/931* (2020.01); *B60W 2050/0083* (2013.01); *B60W 50/0098* (2013.01)

(58) Field of Classification Search
USPC ........................................................ 73/1.01
See application file for complete search history.

(56) References Cited

U.S. PATENT DOCUMENTS

| | | | |
|---|---|---|---|
| 5,790,713 A | 8/1998 | Kamada et al. | |
| 7,822,571 B2* | 10/2010 | Kakinami | G01S 7/497 |
| | | | 702/104 |
| 2009/0284408 A1 | 11/2009 | Bernhardt et al. | |

(Continued)

FOREIGN PATENT DOCUMENTS

| | | |
|---|---|---|
| CN | 103983961 A | 8/2014 |
| JP | 3148045 B2 | 3/2001 |

(Continued)

OTHER PUBLICATIONS

Korean Office Action issued for Application No. KR 10-2021-0160545, dated May 9, 2023.

(Continued)

*Primary Examiner* — Walter L Lindsay, Jr.
*Assistant Examiner* — Warren K Fenwick
(74) *Attorney, Agent, or Firm* — Knobbe, Martens, Olson & Bear, LLP

(57) ABSTRACT

Provided are systems and methods related to calibration courses and calibration targets, which can be configured for calibrating sensors used in vehicles, such as vehicles that include autonomous or semi-autonomous vehicle systems, or other mobile robots. As an example, a system can include a drivable path comprising a plurality of turns, a plurality of calibration targets proximate to the drivable path, and a plurality of obstacles in the drivable path. The plurality of calibration targets are positioned so as to be detectable by at least one sensor of a vehicle as the vehicle traverses the drivable path, and at least one particular obstacle of the plurality of obstacles changes an angle of the at least one sensor relative to at least one calibration target as the vehicle traverses the drivable path.

17 Claims, 16 Drawing Sheets

(56) References Cited

U.S. PATENT DOCUMENTS

2019/0204427 A1    7/2019  Abari et al.
2020/0388053 A1*  12/2020  Wallack ............... H04N 13/282
2023/0089832 A1*  3/2023  Soon ................... B60W 60/001
                                                                         701/23

FOREIGN PATENT DOCUMENTS

JP        2017-026551 A    2/2017
WO      WO-9805922 A1 *  2/1998  ........... G01B 11/002
WO    WO 2019/203840 A1  10/2019

OTHER PUBLICATIONS

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.
"Calibration Pyramid (3 Sizes)", Bluewrist, Jun. 11, 2021 (search date: May 22, 2024), in 2 pages. URL: https://bluewrist.com/product/robot-guidance-calibration-calibration-pyramid/.
Korean Office Action issued for Application No. KR 10-2021-0160545, dated May 23, 2024.
Great Britain Office Action issued for Application No. GB 2115808.4, dated Jul. 6, 2022.
Office Action received for Great Britain Application No. 2115808.4, mailed Aug. 1, 2024.
Office Action received for Great Britain Application No. 2115808.4, mailed Oct. 22, 2024.
Office Action received for Korean Application No. 10-2021-0160545, mailed Feb. 24, 2025.

* cited by examiner

CALIBRATION COURSES AND TARGETS

BACKGROUND

The present application is directed to calibration courses and calibration targets. The calibration courses and the calibration targets can be configured for use in calibrating and/or validating one or more sensors included on vehicles, such as autonomous vehicles, semi-autonomous vehicles, other types of vehicles, or robots.

A vehicle or robot can include one or more sensors configured to facilitate navigation of the vehicle and/or to provide other functionality. For example, one or more sensors can be used to detect one or more objects (e.g., road markers, other vehicles, pedestrians, obstacles, etc.) located in proximity to the vehicle or robot. Such one or more sensors may need to be calibrated and/or validated to, for example, improve the accuracy thereof and/or verify that the one or more sensors are functioning properly.

DETAILED DESCRIPTION

Figure 1:
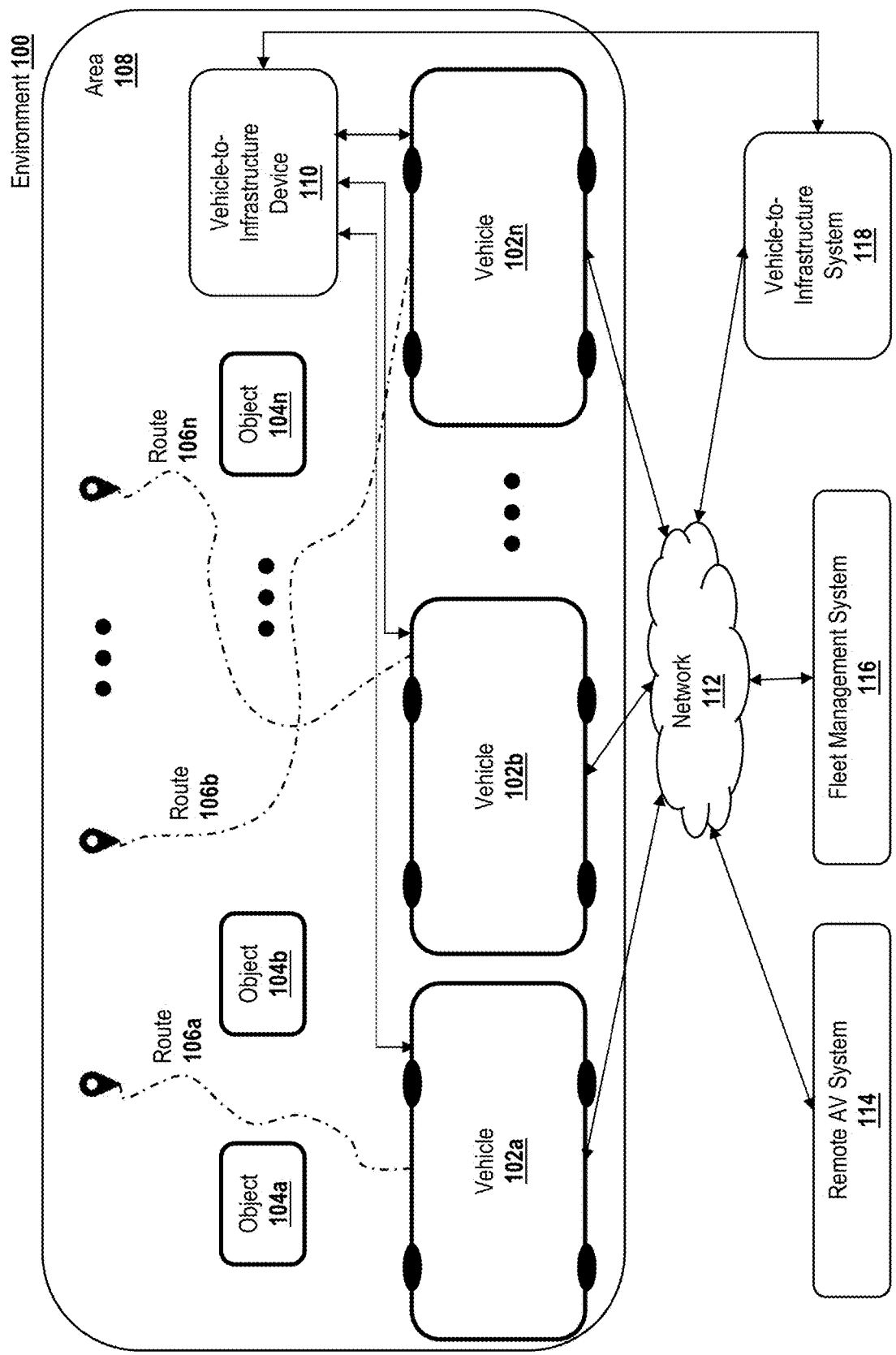
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and/or computer program products described herein include and/or implement calibration courses configured for use during calibration and/or validation of sensors included on vehicles. In some examples, the calibration courses include a drivable path comprising a plurality of turns, a plurality of calibration targets proximate to the drivable path, wherein the plurality of calibration targets are positioned so as to be detectable by at least one sensor of a vehicle as the vehicle traverses the drivable path, and a plurality of obstacles in the drivable path, wherein at least one particular obstacle of the plurality of obstacles changes an angle of the at least one sensor relative to at least one calibration target as the vehicle traverses the drivable path.

By virtue of the implementation of systems, methods, and computer program products described herein, calibration courses as described herein can provide, in various embodiments, one or more of the following advantages. The calibration courses can allow for repeatable and reliable calibration results, which in turn improves the safety of the vehicles. The calibration courses can provide a time-efficient calibration method, for example, reducing maintenance down time and increasing efficiency of one or more vehicles.

In some aspects and/or embodiments, systems, methods, and computer program products described herein include and/or implement a three-dimensional calibration target. The calibration target can include a top surface and at least four side surfaces. An individual side surface has a first edge, a second edge, a third edge, and a fourth edge. The first edge defines a portion of a bottom area. The second edge is shared with the top surface. The third edge is shared with a first adjacent side surface. The fourth edge is shared with a second adjacent side surface. An angle between a side surface and a horizontal plane is different from an angle between an adjacent side surface and the horizontal plane.

In other embodiments, the irregularly shaped, convex, asymmetrical, three-dimensional, lidar calibration target can include a top surface that is angled relative to a bottom area and a plurality of side surfaces. The side surfaces can each be positioned at different angles relative to a horizontal plane. Each of the side surfaces can be coupled to the top surface and to at least two adjacent side surfaces. The side surfaces can be configured to reflect beams from a LiDAR system.

In other embodiments, a vehicle calibration system can include a three-dimensional calibration target. The calibration target can include an irregular, asymmetrical shape that has a top surface and at least four side surfaces. Each side surface can be coupled to the top surface and to two adjacent side surfaces. An angle difference between a horizontal plane and a first side surface can be different from an angle difference between the horizontal plane and a second side surface. The calibration target can be configured to receive at least one beam from a LiDAR system and reflect the beam back to the LiDAR system.

By virtue of the implementation of systems, methods, and computer program products described herein, techniques for calibration targets offer advantages that include easy detection from the use of planar or flat surfaces. Further, the prevention of any shadowed or hidden edges from the angled side surfaces and convex shape improve detection capabilities. For example, the convex shape of the calibration targets can allow for all edges of a visible surface to be seen when approaching the target. Additionally, the use of planar or flat surfaces allows for smaller performance loss during use with LiDAR systems. Further, the use of a uniform material is beneficial for LiDAR intensity calibration and validation.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
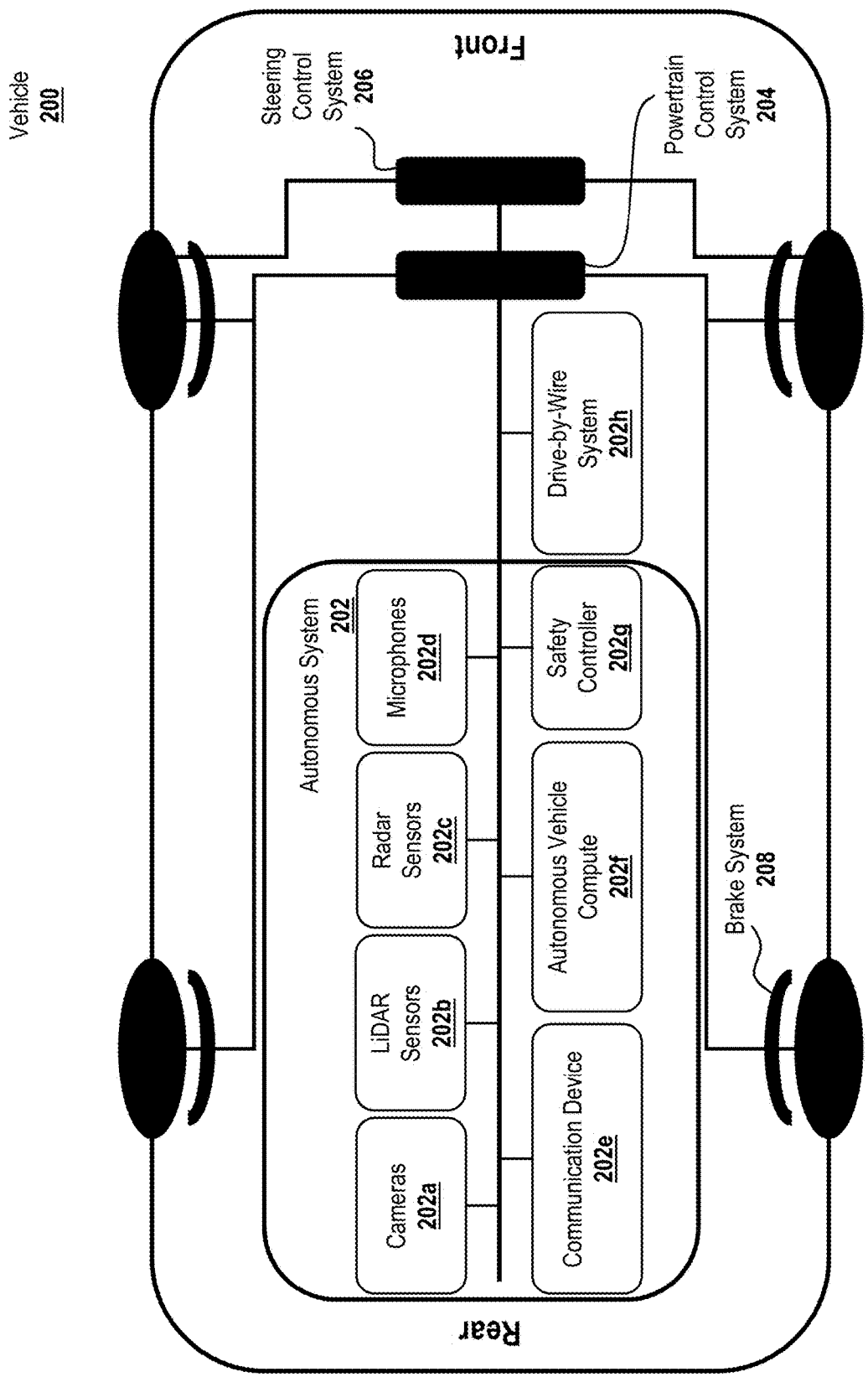
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 200 has autonomous capability (e.g., implements at least one function, feature, device, and/or the like that enables vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
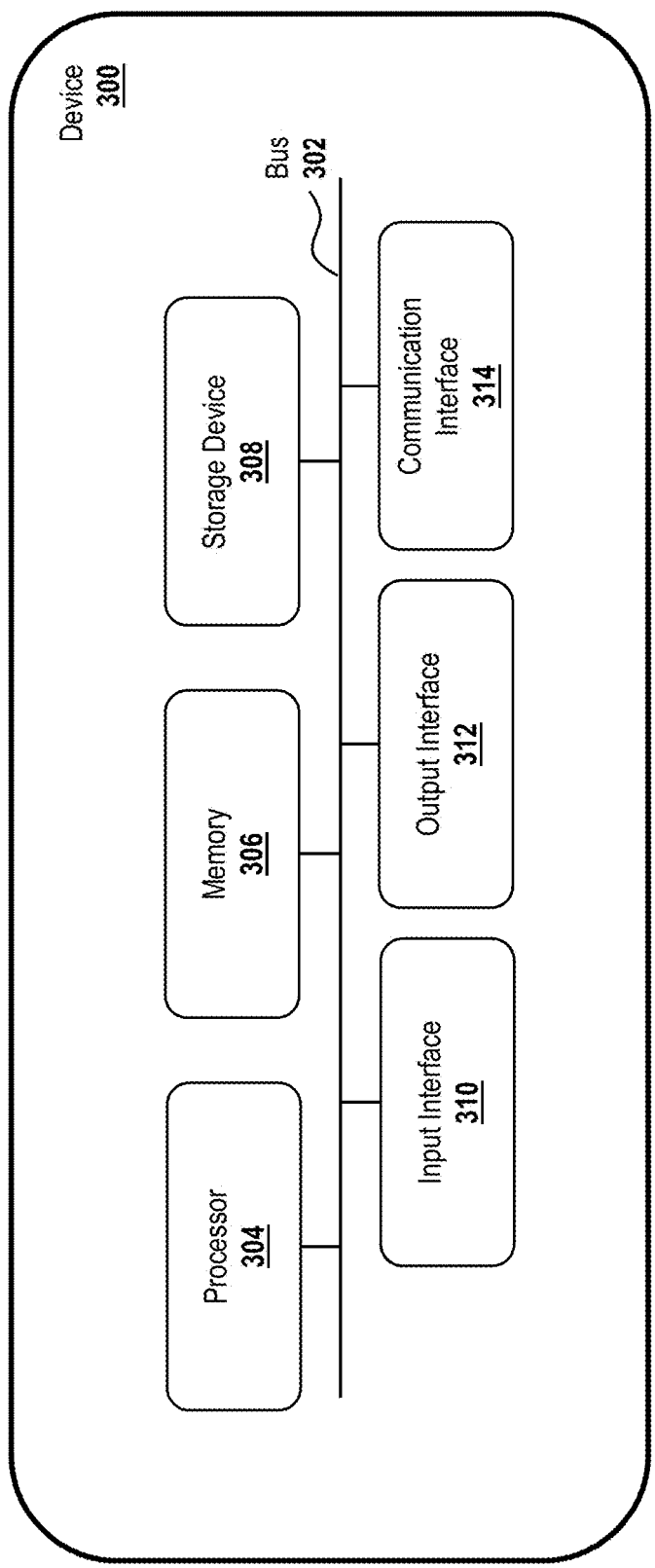
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates traffic light data (TLD) data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d include at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f includes at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one V2I device 110, at least one device of remote AV system 114, at least one device of fleet management system 116 at least one device of V2I system 118, at least one device of vehicle 200 (e.g., at least one device of autonomous system 202, at least one device of DBW system 202h, at least one device of powertrain control system 204, at least one device of steering control system 206, and/or at least one device of brake system 208, and/or one or more devices of network 112 (e.g., one or more devices of a system of network 112). In some embodiments, one or more devices of vehicles 102 (e.g., one or more devices of a system of vehicles 102)), at least one V2I device 110, at least one device of remote AV system 114, at least one device of fleet management system 116 at least one device of V2I system 118, at least one device of vehicle 200 (e.g., at least one device of autonomous system 202, at least one device of DBW system 202h, at least one device of powertrain control system 204, at least one device of steering control system 206, and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4:
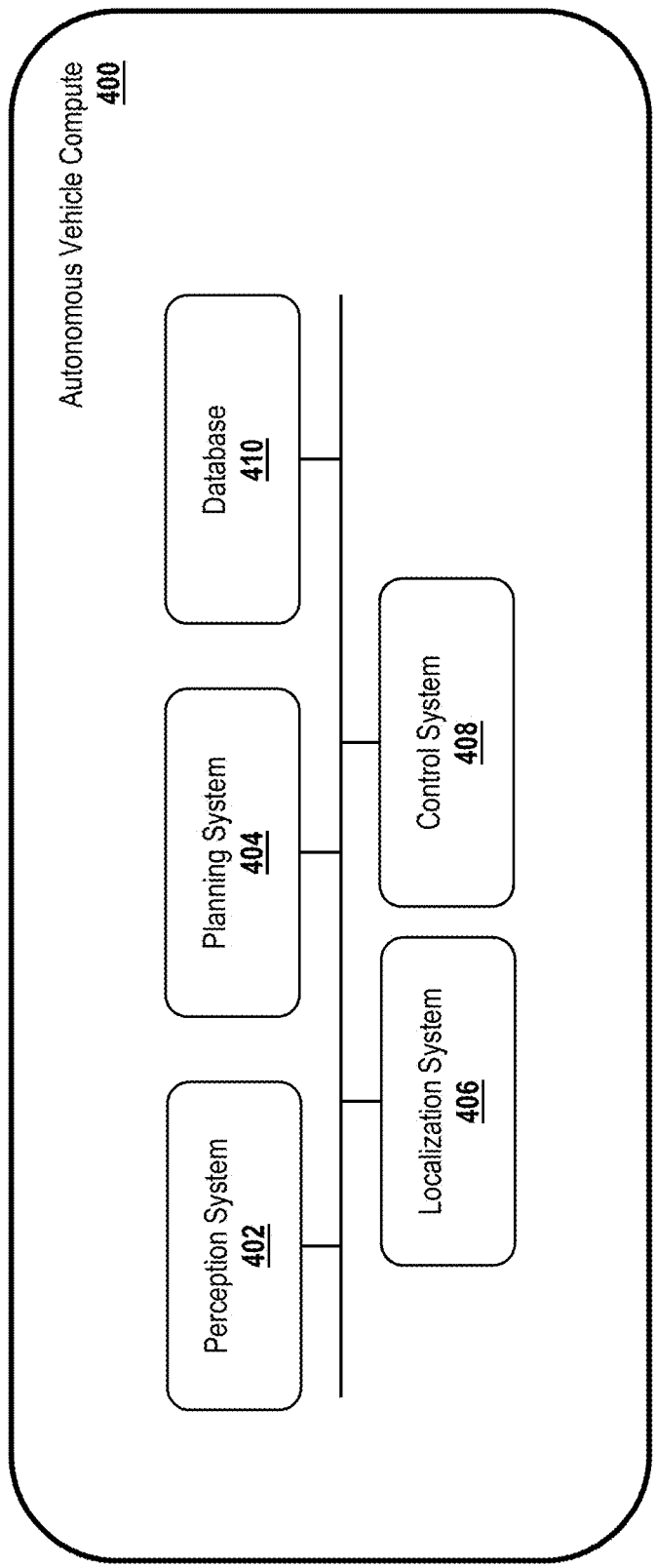
FIG. 4 is a diagram of certain components of an autonomous system.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits (ASICs), Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like).

In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like).

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Calibration Courses and Calibration Targets

As described above, vehicles (e.g., vehicles 102 of FIG. 1 or vehicle 200 of FIG. 2, or others) can include one or more sensors configured to facilitate navigation of the vehicles. For example, as illustrated in FIG. 2, the vehicle 200 includes autonomous system 202, which includes one or more cameras 202a, LiDAR sensors 202b, and radar sensors 202c, among other components. In some instances, it is desirable to calibrate and/or verify these sensors to ensure that they are working properly and to improve the overall safety and efficiency of the sensors and the vehicles.

As described herein, a calibration course can be provided which is configured to be used for calibration and/or validation of such sensors. The calibration course can include a path that can be traversed by a vehicle. One or more calibration targets can be positioned proximate to the path so as to be detectable by the sensors of the vehicle as it traverses the path. That path may include one or more obstacles that are traversed by the vehicle as it moves along the path. In some embodiments, the one or more obstacles are configured to change an angle between a sensor of the vehicle and the calibration target. As the vehicle traverses the path, data can be gathered by sensors of the vehicle as the sensors detect the one or more calibration targets. Such data can be analyzed or otherwise processed to calibrate and/or validate the sensors of the vehicle.

In some instances, sensor calibration and validation can involve the detection of one or more targets or other features in a known or predefined environment. For example, during calibration, sensors are presented with one or more known targets for detection in a fixed environment. Because the target and environment are known, the data collected by the sensors can be used to verify and calibrate the sensors. In some instances, the target positions can be unknown (e.g., not predetermined or previously known) relative to the position of the course or vehicle.

However, due to the diversity of natural environments, which can be further varied due to various conditions (e.g., weather, time of day, lighting, etc.), many approaches for calibrating sensors of vehicles often rely on performing calibration in a fixed indoor environment using known targets to ensure the reliability and repeatability of the calibration and validation procedures. That is, outdoor and natural environments, have generally previously not been used for calibration and validation of vehicle sensors due to the high degree of variation and unpredictability associated therewith.

Although indoor calibration of vehicle sensors can provide a high degree of uniformity and repeatability, there are disadvantages associated with traditional indoor calibration. For one, in order to maintain the safe operation of a large fleet of vehicles, it may be desired to perform sensor calibration and validation frequently (e.g., daily, weekly, monthly, or after a certain number of operational hours of a vehicle, such after 5 hours, after 10 hours, after 20 hours, after 50 hours, after 100 hours, after 200 hours, etc.). Sensor calibration and validation processes that rely on a fixed indoor calibration environment are generally very time consuming, and thus may not be able to meet the calibration and validation needs of a large fleet of vehicles. This can be, for example, because the sensors of only one vehicle at a time can be calibrated and/or validated using a fixed indoor calibration course. For example, in some embodiments wherein the sensors of a vehicle are calibrated using a fixed indoor calibration room, the calibration rate can be about one vehicle every ninety minutes. This rate may be too slow to accommodate the needs of a large fleet.

The calibration courses described herein can be configured to provide a solution to one or more of the problems noted above. For example, the calibration courses described herein can allow for calibration and/or validation of sensors of vehicles in an outdoor environment (although this need not be the case in all embodiments, and the calibration courses described herein can also be used in an indoor environment). As another example, the calibration courses described herein can be configured to increase the rate at which the sensors of vehicles can be calibrated and/or validated. In some embodiments, this can be accomplished because more than one vehicle can use the calibration course at the same time. As briefly mentioned above, the calibration course can include a path configured to be traversed by a vehicle. In some embodiments, more than one vehicle can traverse the path at the same time. For example, in some embodiments, one, two, three, four, five, six, seven, eight, nine, ten, fifteen, twenty, thirty, forty, fifty, or more vehicles can traverse the path of the calibration course at the same time. This can greatly increase the rate at which vehicles can be processed.

Figure 5:
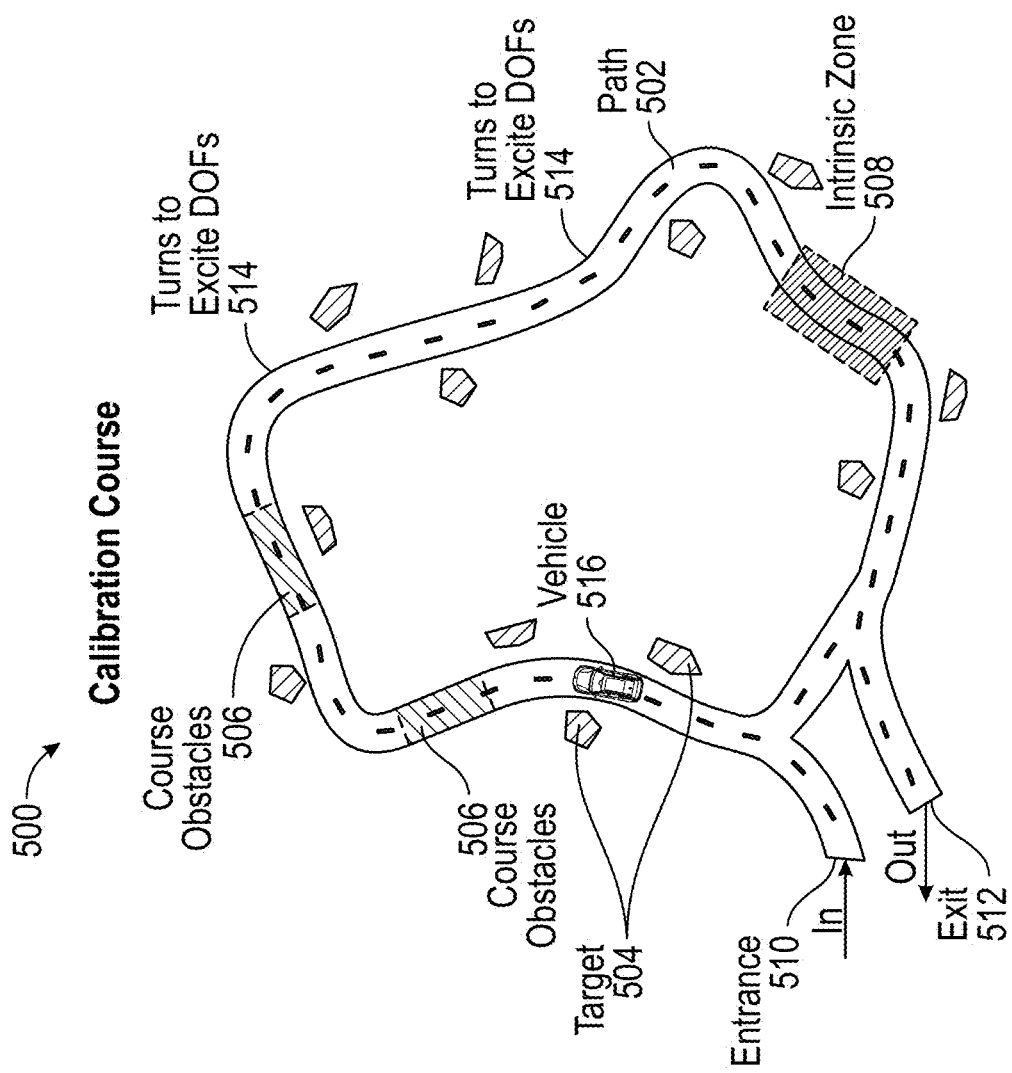
FIG. 5 is an overhead view of an embodiment of a calibration course configured for use in calibrating and/or verifying one or more sensors of one or more vehicles.

FIG. 5 is an overhead, schematic view of an embodiment of a calibration course 500. In the illustrated embodiment, the calibration course 500 includes a path 502, one or more calibration targets 504, one or more obstacles 506, and one or more zones 508. Although a particular arrangement of these features is illustrated in FIG. 5, the illustrated arrangement should not be construed as limiting. A wide variety of other arrangements are also possible. Additionally, the calibration course 500 need not include all of the components illustrated in FIG. 5. In some embodiments, the calibration course 500 can also include additional components that are not illustrated in FIG. 5.

The path 502 of the calibration course is configured to be traversed by one or more vehicles 516 (which may be the same or similar to the vehicles 102 of FIG. 1 or the vehicle 200 of FIG. 2). In some embodiments, the vehicles 516 drive or are driven along the path 502. Accordingly, in some embodiments, the path 502 can be considered a drivable path. The path 502 may be configured as a road or other surface on which vehicles 516 can be driven. In some embodiments, the vehicle 516 is driven along the path 502 by an operator, such as a human driver. In some embodiments, the vehicle 516 is driven along the path 502 under the control of an autonomous system. That is, in some embodiments, the vehicle 516 can traverse the path 502 in an autonomous way, without requiring a human driver. In some embodiments, vehicles 502 traverse the path by other means. For example, in some embodiments, vehicles 502 can be towed or otherwise pulled around the path 502 by another vehicle. In some embodiments, vehicles 502 can be positioned on carts or other platforms that are moved around the path. For example, in some embodiments, the path 502 comprises a track (e.g., a train-style track) and vehicles 516 can traverse the path 502 on cars (e.g., train-style cars) that are positioned on the track.

The overall length of the path 502 can be configured based on the calibration and validation process performed using the calibration course 500. For example, in some embodiments, the length of the path 502 is sufficient to allow for calibration and/or validation of the sensors of the vehicle 516 with only a single pass through the path 502. In other embodiments, vehicles 516 may make multiple passes through the path 502 in order to provide sufficient time for calibration and/or validation of the sensors. As examples, in some embodiments, the length of the path 502 can be $1/10^{th}$ of a mile, $1/8^{th}$ of mile, $1/6$th of a mile. $1/4$ of a mile, $1/2$ a mile, $3/4$ of a mile, or 1 mile, although other lengths, both longer and shorter are possible.

The time required for the vehicle 516 to traverse the path 502 depends on the length of the path as well as the speed (e.g., the average speed) of the vehicle 516. In some embodiments, for example, the time required for the vehicle 516 to traverse the path 502 can be about 30 seconds, about 1 minute, about 2 minutes, about 5 minutes, about 10 minutes, about 15 minutes, about 20 minutes, about 30 minutes, about 1 hour, or about 1.5 hours, although, in other embodiments, shorter and or longer times are also possible. In some embodiments, the vehicle 516 traverses the path 502 with an average speed of about 5 miles per hour, about 10 miles per hour, about 15 miles per hour, about 20 miles per hour, about 25 miles per hour, about 30 miles per hour, about 40 miles per hour, about 45 miles per hour, about 50 miles per hour, or about 60 miles per hours, although other average speeds, both faster and slower are possible. In some embodiments, the vehicle 516 traverses the path 502 with a generally constant speed. In some embodiments, the vehicle 516 changes its speed (e.g., speeds up and/or slows down) as it traverses the path 502. The course 500 can be configured such that, during calibration or validation, the vehicle 516 traverses the path with a specified velocity profile (e.g. a velocity-time profile or a velocity-position profile).

In the illustrated embodiment of FIG. 5, the path 502 includes an entrance 510 and an exit 512. The vehicle 516 can gain access to the path 502 through the entrance 510 and exit the path 502 through the exit 512. As shown in the illustrated embodiments, the path 502 can in some instances be configured as a loop such that, after entering the path 502 through the entrance, the vehicle 516 can traverse the path 502 multiple times before exiting the path 502 through the exit 512. Although illustrated as a loop, the path 502 need not be a loop in all embodiments. For example, in some embodiments, the path 502 extends solely from the entrance 510 to the exit 512.

With continued reference to FIG. 5, the path 502 can include one or more turns 514 (e.g., changes in direction) positioned along the length of the path 502. The turns 514 can include left-hand and/or right-hand turns of varying degree. For example, the turns 514 can comprise slight turns having a change of direction of less than 60 degrees, moderate turns having a change of direction of between 60 and 120 degrees, or sharp turns having a change of direction of greater than 120 degrees in either direction (left-hand or right-hand). In the illustrated embodiment, the path 502 comprise about seven turns 514 of different degree and direction. In other embodiments, the path 502 can comprise other numbers of turns 514. For example, a path 502 can include one, two, three, four, five, six, seven, eight, nine, ten, fifteen, twenty, twenty-five, or more turns 514. Between the turns 514, the path 502 may include linear (e.g., straight sections) or the turns 502 may be connected by slight bends or curves. In some embodiments, the path 502 may be a linear (e.g., straight) path and thus may include no turns 514.

In some embodiments, use of a standardized or known path (e.g., of known length, shape, etc.) can facilitate calibration by allowing calibration algorithms to run consistently and reliably. For example, machine learning algorithms may need only to generalize to the known route configuration. In some examples, use of a known route configuration can reduce the variability in input, making it easier to train a machine learning algorithm and help to cover some or all possible edge cases. This can lead to making the algorithm work more consistently and reliably.

As mentioned above, the calibration course 500 can be configured such that it can be used by more than one vehicle 516 at a time. That is, in some embodiments, a plurality of vehicles 516 can traverse the path 502 at the same time, for example, one after another. In some embodiments, vehicles 516 traversing the path are separated by a minimum distance of at least 10 feet, 15 feet, 20 feet, 25 feet, 30 feet, 40 feet, 50 feet, 75 feet, 100 feet, 150 feet, 200 feet, 250 feet, or 500 feet, although other distances, both longer and shorter, can be used in other embodiments. The minimum distance between vehicles can be the distance measured along the path 502 between a first vehicle 516 and a second vehicle 516 that is either in front of or behind the first vehicle 516 on the path 502. By configurating the calibration course 500 such that multiple vehicles 516 can traverse the path 502 simultaneously, the overall rate at which the sensors of the vehicles 516 can be calibrated can be increased, especially compared with calibration processes that can only process a single vehicle at a time. This becomes particularly advantageous when calibrating the sensors of a large number of vehicles, such as within a large fleet of vehicles.

As shown in FIG. 5, one or more calibration targets 504, obstacles 506, and zones 508 may be positioned along, on, adjacent to, or in proximity to the path 502 of the calibration course. The calibration targets 504, obstacles 506, and zones 508 are configured to facilitate the calibration and/or validation of sensors of the vehicle 516 based on data collected with the sensors as the vehicle 516 traverses the path 502. In some embodiments, the sensors to be calibrated and/or validated include, for example, the sensors of autonomous system 202 of FIG. 2 (e.g., one or more vision-based sensors or cameras 202a, one or more LiDAR sensors 202b, one or more radar sensors 202c, and/or one or more sound-based sensors or microphones 202d), although other types of sensors can be calibrated using calibration courses 500 as described herein as well.

With continued reference to FIG. 5, the calibration course 500 includes one or more calibration targets 504. As shown in FIG. 5, the one or more calibration targets 504 are positioned adjacent to or in proximity to the path 502. More specifically, the calibration targets 504 are positioned relative to the path 502 such that the calibration targets can be detected by one or more sensors of the vehicle 516 as the vehicle traverses the path 502. In some embodiments, the calibration targets 504 are positioned within about 5 feet, within about 10 feet, within about 15 feet, or within about 20 feet of the path 502, although other positions for the calibration targets, both nearer and farther from the path 502 are possible.

The specific number and arrangement of calibration targets 504 shown in FIG. 5 is provided by way of example and should not be construed as limiting. Other numbers of and positions for the calibration targets 504 are also possible. For example, in some embodiments, the calibration course includes at least one, two, three, four, five, ten, fifteen, twenty, twenty-five or more calibration targets 504. Further, the calibration targets 504 can be positioned on each side of the path 502. For example, some of the calibration targets 504 can be positioned on the left side of the path (relative to the vehicle 516 traversing the path 502) and some of the calibration targets 504 can be positioned on the right side of the path (relative to the vehicle 516 traversing the path 502). In some embodiments, about half of the total calibration targets 504 are on the left side of the path, and about half the total calibration targets 504 are on the right side of the path, although other arrangements and distributions of the calibration targets 504 are possible.

The calibration targets 504 may further be positioned relative to the path 502 such that they can be detectable by the various sensors positioned with different orientations on the vehicle 516. For example, the vehicle 516 may include various sensors that are oriented in a generally forward direction, a generally rightward direction, a generally leftward direction, and a generally rearward direction. The course 502 and the calibration targets 504 should be, in some embodiments, configured and positioned such that each of these directional sensor groups can be calibrated. In some embodiments, calibration targets 504 can be used for more than one of these directional sensor groups. For example, a calibration target 504 can first be detected by a forward-facing sensor(s) as the vehicle approaches the calibration target 504 (allowing calibration of the forward-facing group). The same calibration target 504 can then be detected by either the left or right-side sensor(s) as the vehicle 516 passes the calibration target 504. Finally, the same calibration target can then be detected by the rear facing sensor(s) as the vehicle moves past and away from the calibration target 504. This can be facilitated by placement of the calibration targets 504 as well as configuration of the path 502 relative to the calibration targets 504.

In general, the position and nature of the calibration targets 504 can be configured based on the type of sensor to be calibrated. For example, a calibration target 504 that is configured to calibrate a LiDAR sensor can be positioned relative to the path 502 such that the calibration target 504 is within the range of the LiDAR sensor. In some examples, the range of the LiDAR sensor may be about 50 meters. Further, the shape of the calibration target 504 can be configured to facilitate calibration of a LiDAR sensor. Example, calibration targets that are configured for use with calibration of LiDAR sensors are described below with reference to FIGS. 10A-13.

In some embodiments, to calibrate LiDAR sensors, a calibration target 504 is provided by the calibration course 500 at a position that allows the calibration target 504 to simultaneously be detectable by at least two different LiDAR sensors included on the vehicle 516. For example, in some instances, calibration of LiDAR sensors comprises correlating or establishing a relationship between the output of two or more LiDAR sensors. Each LiDAR sensor can be configured to generate a point cloud representative of the environment detected by the LiDAR sensor. When a known calibration target 504 is detected within the point clouds of two different LiDAR sensors on the vehicle 516, this data can be used to calibrate the LiDAR sensors. Accordingly, in some embodiments, one or more of the calibration targets 504 that are configured for the calibration or validation of LiDAR sensors should be positioned such that they are detectable within a region of overlap between two LiDAR sensors.

In some embodiments, one or more of the calibration targets 504 can be configured to facilitate calibration and/or validation of one or more vision-based sensors or cameras on the vehicle 516. In some embodiments, this can be achieved by creating a visual pattern on one or more surfaces of the calibration target 504, wherein the visual pattern can be detectable within an image received from the cameras. Example visual patterns are shown, for example, in FIGS. 8A and 8B, which are described below.

In some embodiments, one or more calibration targets 504 can be configured for calibration of radar sensors on the vehicle 516. For example, calibration targets 504 can comprise a material that includes a high degree of radar scattering.

In some embodiments, one or more of the calibration targets 504 can be configured for calibration of sound-based sensors or microphones on the vehicle 516. For example, a calibration target 504 can include a speaker for generating a sound that can be detected by a microphone on the vehicle 516. The data generated by the microphone as it detects the sound generated by the calibration target 504 can be used to calibrate and/or validate the microphone of the vehicle 516.

Calibration targets 504 can be configured for calibration of a particular, single sensor type (e.g., one of LiDAR, radar, vision-based, or sound-based), or calibration targets 504 can be configured for calibration of multiple sensor types (two or more of LiDAR, radar, vision-based, or sound-based). For example, as mentioned above (and described in more detail below with reference to FIGS. 10A-13), a calibration target 504 can include a shape that is configured for use with calibrating LiDAR sensors and surface textures or patterns that are configured for calibrating vision-based or camera sensors. Alternatively, different calibration targets 504 can be provided for calibrating different types of sensors.

With continued reference to FIG. 5, the calibration course 500 can include one or more course obstacles 506. The course obstacles 506 can include, for example, features formed on or in the path 506 over which the vehicle 516 traverses. For example, a course obstacle 506 can include a bump (such as a speed bump or other larger bumps) formed on the path 502. As another example, a course obstacle 506 can include one or more ramps or angled surfaces formed on or in the path 502. In some embodiments, the ramps or angled surfaces can be configured to angle or slope towards the right or left edge of the path. Other types of obstacles 506 over which the vehicle 516 can traverse are also possible. For example, obstacle 506 may include a feature which simulates a pothole or a feature which acts as a bump to wheels on only a single side of the vehicle.

In some embodiments, the obstacles 506 are configured to alter or change the orientation of one or more sensors of the vehicle 516 relative to one or more calibration targets 506. For example, a sensor of the vehicle 516 may detect a calibration target 504 while the vehicle 516 is positioned on a flat (e.g., level or horizontal) section of the path 502. The vehicle 516 may then traverse an obstacle 506 causing the orientation between the sensor and the calibration target 504 to change. Detecting the calibration target 504 from different orientations may further facilitate calibration and/or validation of the sensor. Accordingly, in some embodiments, one or more of the obstacles 506 can be positioned in proximity to one or more calibration targets 504. That is, the one or more of the obstacles 506 can be positioned so the one or more calibration targets 504 are detectable by one or more sensors of the vehicle 516 while the vehicle 516 traverses the obstacle.

Stated another way, in some embodiments, the obstacles 506 can be configured to alter one or more degrees of freedom of the vehicle 516 relative to the calibration targets 504. For example, the obstacles 506 can be configured to cause a change in the pitch or roll of the vehicle 516 (and the corresponding sensors positioned on the vehicle 516) relative to a calibration target 504. Similarly, the turns 514 can be configured cause a change in the yaw of the vehicle 516 (and the corresponding sensors positioned on the vehicle 516) relative to a calibration target. Accordingly, in some embodiments, the turns 514 may be considered a type of obstacle 506 as they can be configured to adjust the orientation between the sensors and a calibration target 504.

In some embodiments, the calibration course 500 includes one, two, three, four, five, six, seven, eight, nine, ten, fifteen, twenty, twenty-five or more obstacles 506 positioned along the path 502.

In some embodiments, one or more of the calibration targets 504 can be configured to move to adjust or alter an orientation between the sensors and the calibration targets 506.

As shown in FIG. 5, the calibration course 500 may also include one or more zones 508. The zones 508 can be areas along the path 502 that are specifically configured to allow calibration for a specific type of sensor (e.g., a radar calibration zone, a camera calibration zone, a LiDAR calibration zone, etc.). In some embodiments, the zones 508 can be modular such that they can be moved from one location along the path 502 to another location along the path.

The calibration course can be configured to be used during several types of calibration or validation procedures, such as LiDAR to radar calibration, LiDAR to LiDAR calibration, camera to LiDAR calibration, and others.

In some embodiments, the calibration course 500 may be provided outdoors. In other embodiments, the calibration course 500 may be provided indoors. One consideration in whether to provide the calibration course 500 indoors or outdoors relates to the size of the course. In some embodiments, it may be more feasible to provide the course outdoors so that it can be sufficiently large to enable calibration and testing over the entire range of the sensors and to accommodate the path 502. In other instances, it may be desirable to provide the course indoors so that weather and lighting effects can be controlled. In some embodiments, the calibration course 500 can be flexible or modular. That is, the calibration targets 504, obstacles 508, or other features of the course can be moved or adjusted in new locations.

Calibration or validation of sensors using data received while traversing the calibration course 500 may include the use of one or more software-based components or modules. For example, one or more software modules may be associated with control of the calibration course. Such software can be configured to interface with the calibration course and to control its automation capabilities (e.g., to manage the vehicles 516 coming in and out of the course). Such modules may also be configured to control any electronically controllable elements (e.g. lights, actuators) of the course.

Additionally, calibration or validation may include the use of one or more on-vehicle sensor software modules. For example, in order to calibrate the vehicle's sensors, the calibration system must have access to the sensor data, either as part of the on-vehicle software system or via an external logging interface (which the vehicle must provide sensor observations to).

Additionally, one or more calibration algorithms can be utilized. Given the sensed data from vehicle and/or course, there may be software module(s) or other features, such as features of the AV compute 400, that are configured to combine the data and apply algorithms to estimate the calibration. These algorithms could be run in real-time with direct feedback and control of the course or processed in an offline manner via logged data playback. The course can be specifically designed to work in tandem with calibration algorithms such as Ego-Motion estimation, hand-eye calibration, and machine learning.

Figure 6:
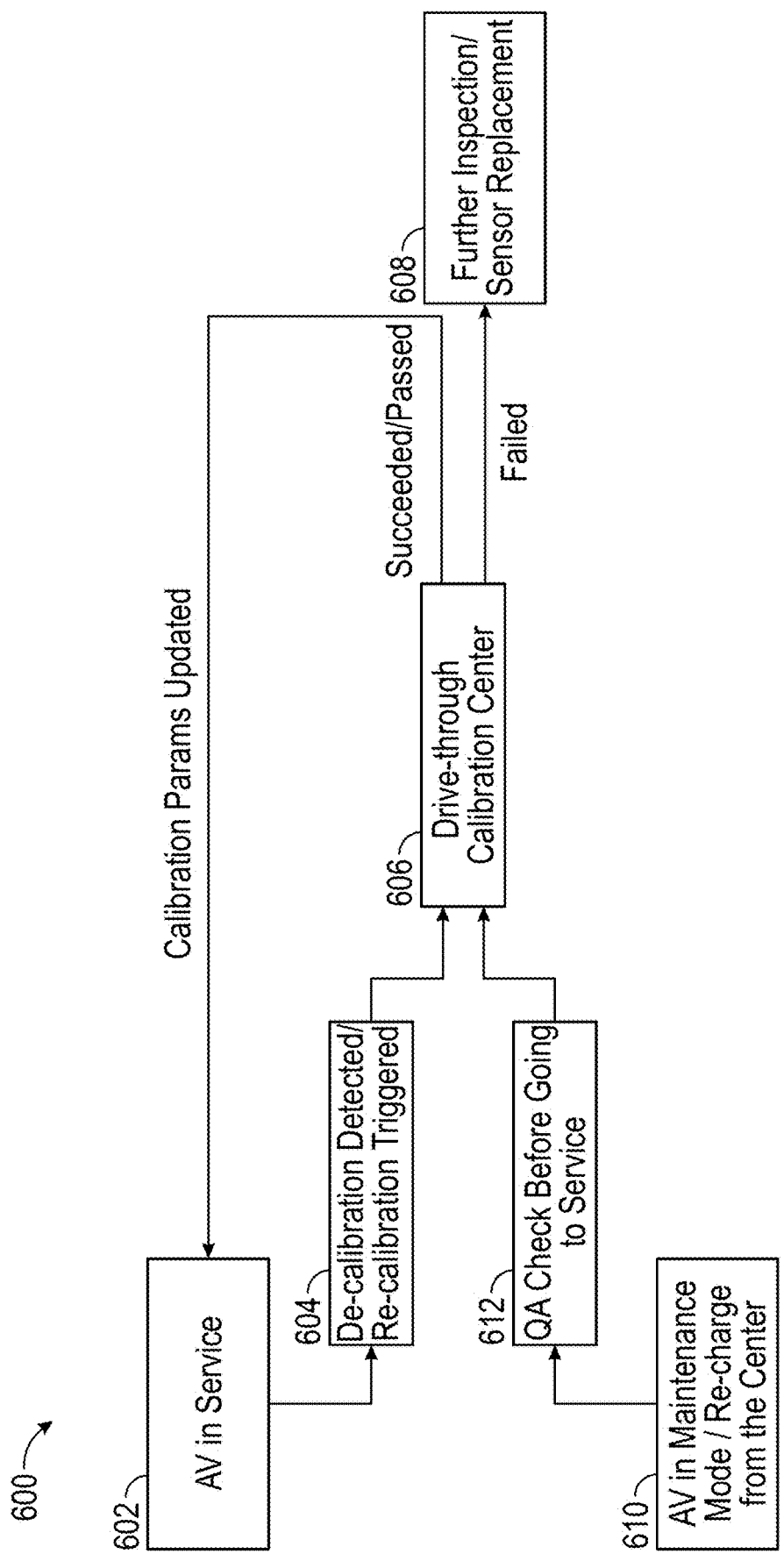
FIG. 6 is a flowchart illustrating an example method for calibrating and/or verifying one or more sensors of one or more vehicles using a calibration course.

FIG. 6 is a flowchart illustrating an example method 600 for calibrating and/or validating one or more sensors of one or more vehicles using a calibration course. The calibration course can be the same or similar to the calibration course 500 of FIG. 5. Beginning at block 602, a vehicle including one or more sensors to be calibrated and/or verified can be in service (e.g., out driving on the road). Block 604 represents, that for a vehicle in service, a de-calibration of the sensors can be detected, or an event can occur that can trigger a recalibration. For example, if the performance of the sensors falls below a threshold, a system can determine that the sensors have become de-calibrated. As another example, certain events may cause the system to trigger a recalibration (e.g., provide an indication that a recalibration is necessary). This can occur, for example, after a certain period of time has passed.

Once de-calibration is detected or recalibration is triggered, the vehicle may be sent to the calibration course, as indicated by block 606. At block 606, the vehicle may traverse the calibration course gathering data with its sensors that is used to calibrated and/or validate the sensors. If the calibration or validation is determined be successful, the vehicle may be placed back into service, for example, as indicated by block 602. As shown in FIG. 6, if the calibration or validation is successful, calibration parameters associated with the sensors can be updated based on the data determined at block 606, and the vehicle can be returned to service, at block 602, with the updated calibration parameters. If the vehicle is not successfully calibrated or validated at block 606, the vehicle can be taken out of service for further inspection and/or maintenance at block 608.

Block 610 illustrates that vehicles returning from maintenance or charging can undergo a quality assurance check, at block 612, before returning to service. In some embodiments, such vehicles may be sent to the calibration course at block 606, before fully re-entering into service.

The method 600 of FIG. 6 illustrates that use of a calibration course may be beneficial in managing a fleet of vehicles by periodically or on as-needed basis, calibrating and/or validating the sensors of the vehicles. This may further improve the safety of such vehicles and avoid accidents. As described above, it may be desired to perform sensor calibration and validation frequently (e.g., daily, weekly, monthly, or after a certain number of operational hours of a vehicle, such after 5 hours, after 10 hours, after 20 hours, after 50 hours, after 100 hours, after 200 hours, etc.) or after certain triggering events (e.g., charging, maintenance, accidents, etc.).

Figure 7A:
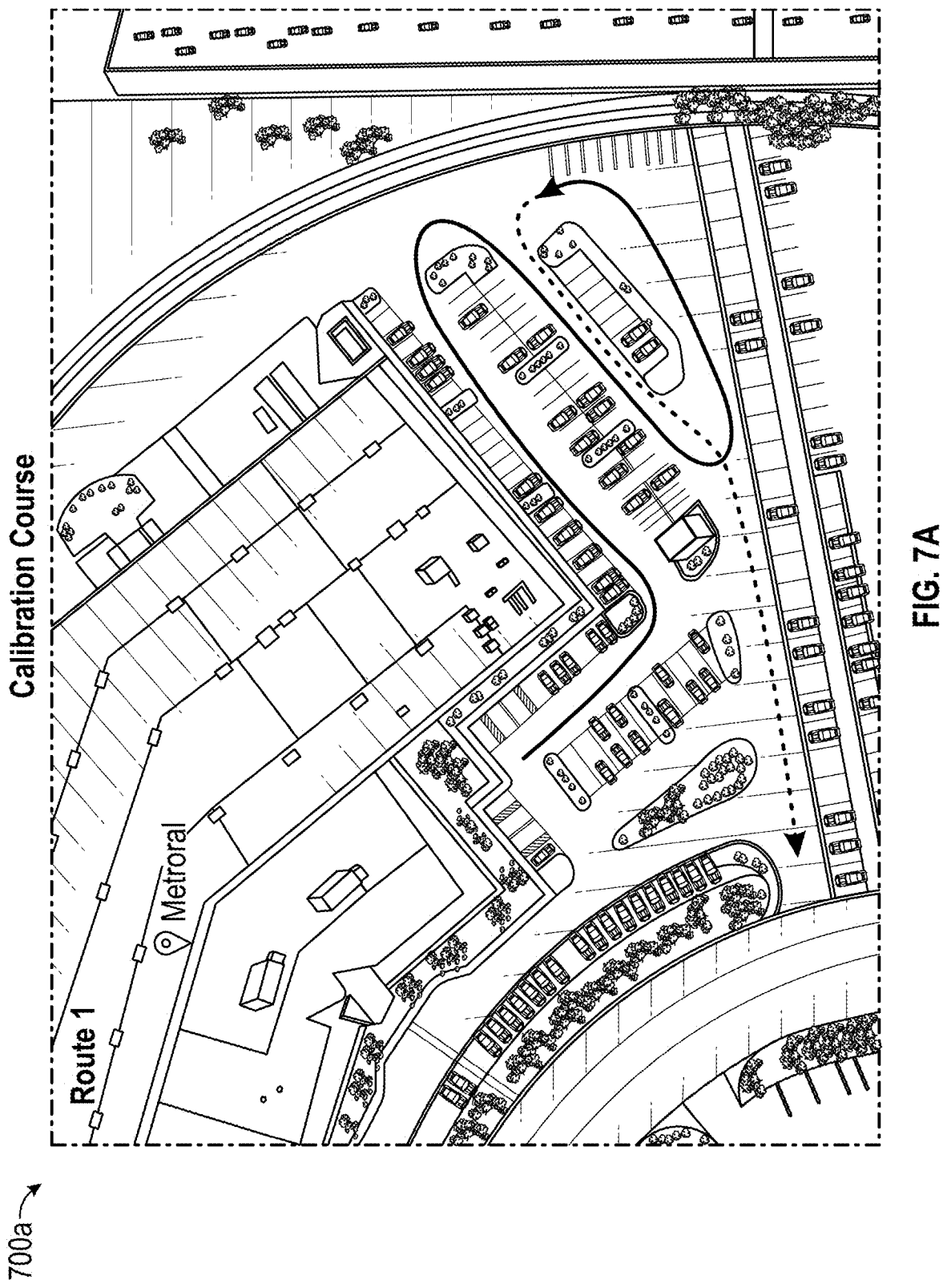
FIG. 7A, FIGS. 7B, and 7C illustrate overhead views of example calibration course routes that have been tested and have proven effective in calibrating and/or validation sensors of vehicles.
Figure 7B:
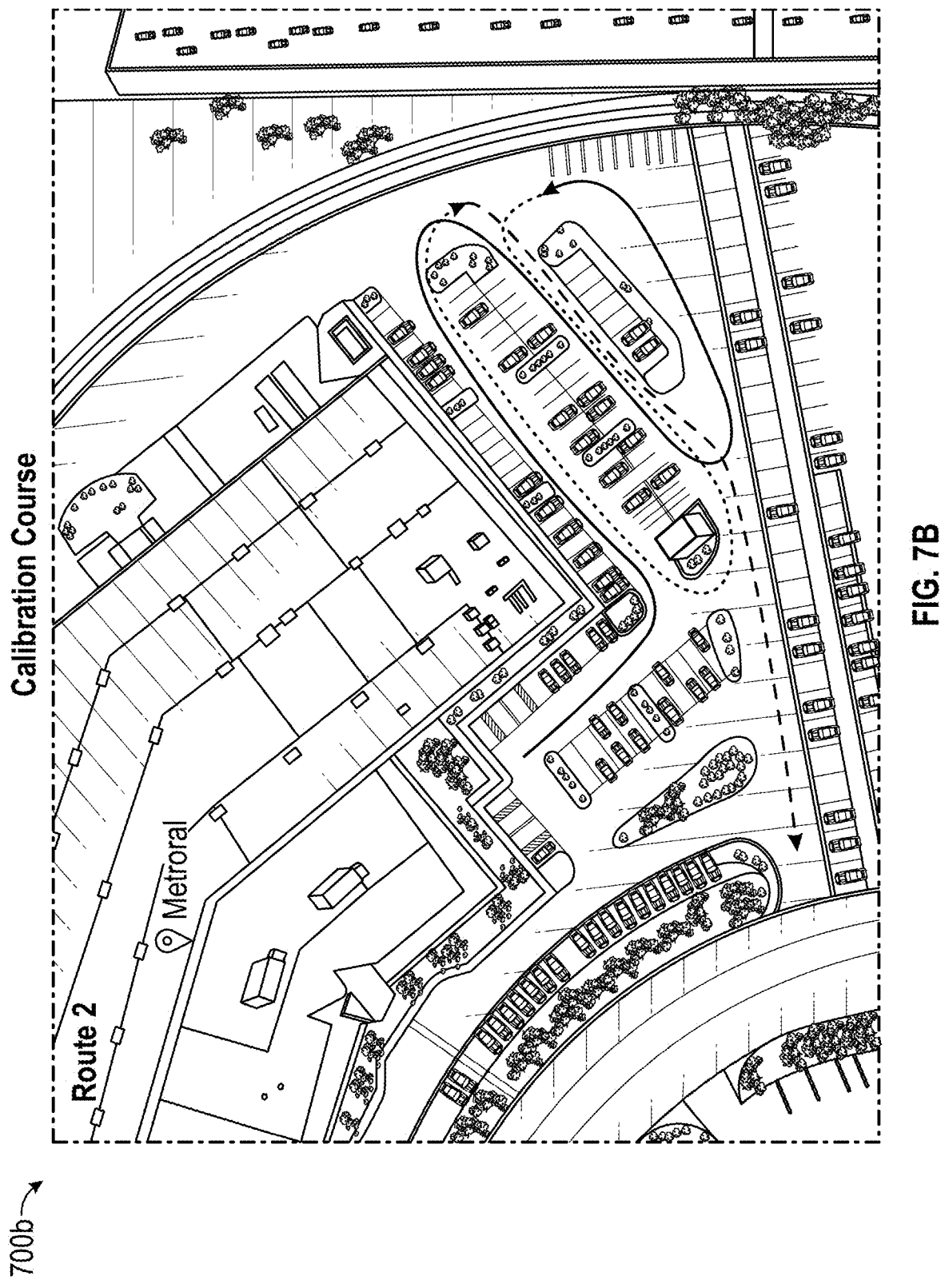
Figure 7C:
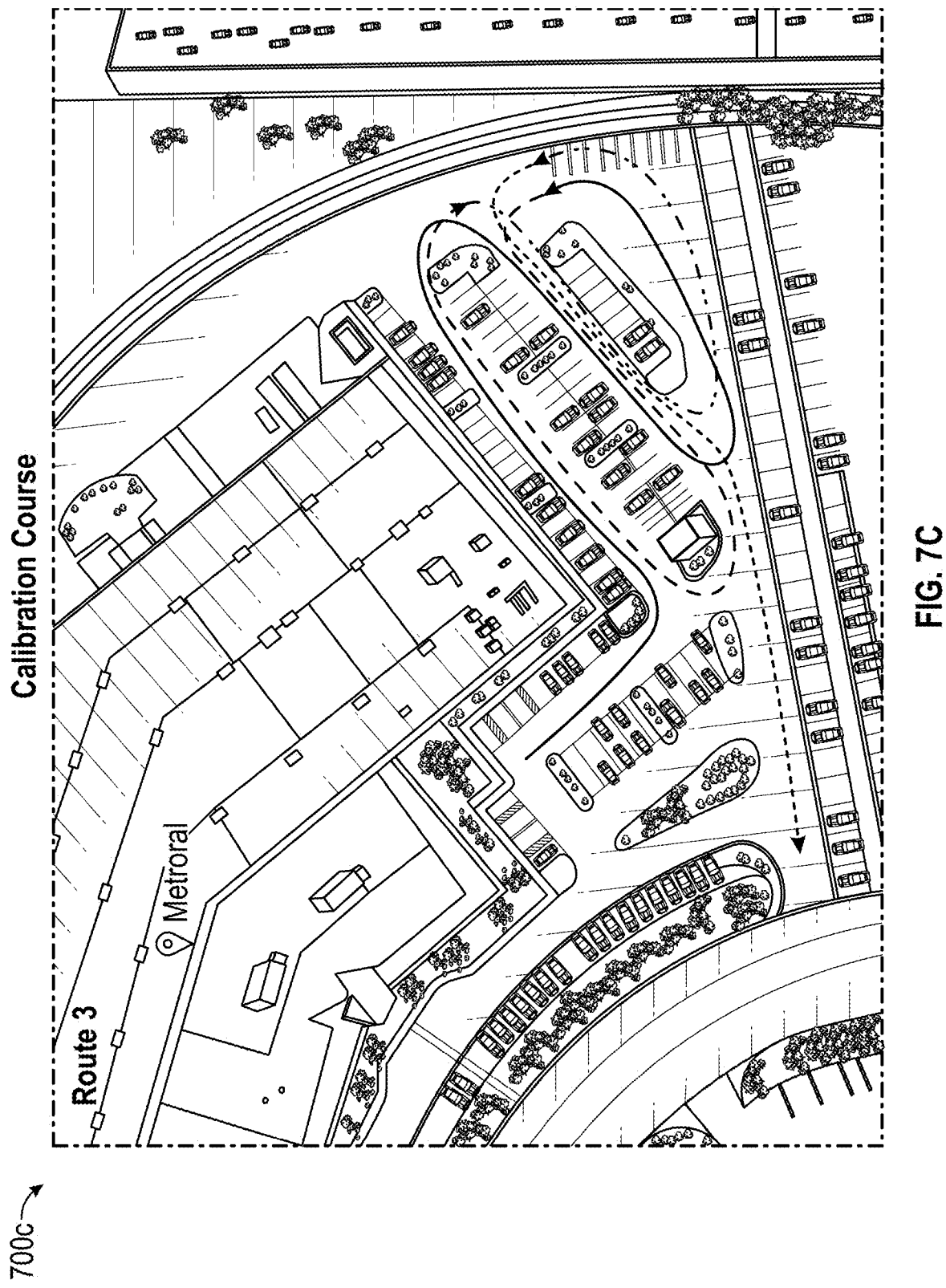

FIG. 7A, FIGS. 7B, and 7C illustrate overhead views of example calibration course routes that have been tested and have proven effective in calibrating and/or validation sensors of vehicles. In FIG. 7A, the example route 700a includes a total length of about 1291 feet and comprises a single figure-eight shape through the parking lot. In FIG. 7B, the example route 700b includes a total length of about 1915 feet and comprises one and a half trips around the figure-eight loop. In FIG. 7C, the example route 700c includes a length of about 2316 feet and includes two trips around the figure-eight loop. During testing with the examples routes of FIGS. 7A-7C it was determined that the route 700a was sufficient for calibration and validation.

Figure 8A:
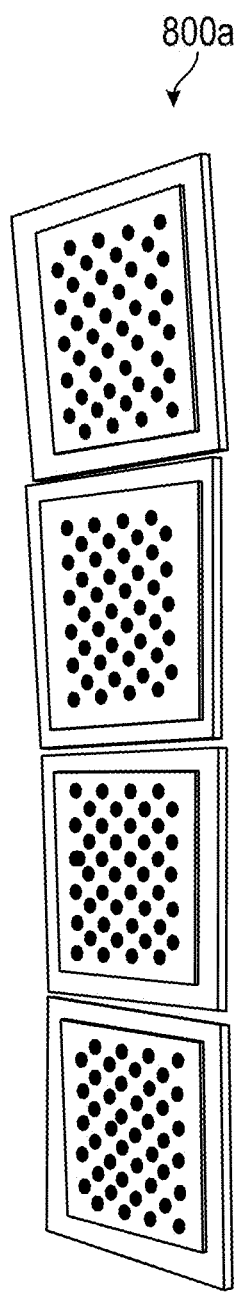
FIGS. 8A and 8B illustrate example visual patterns that can be included on some calibration targets in some embodiments.
Figure 8B:
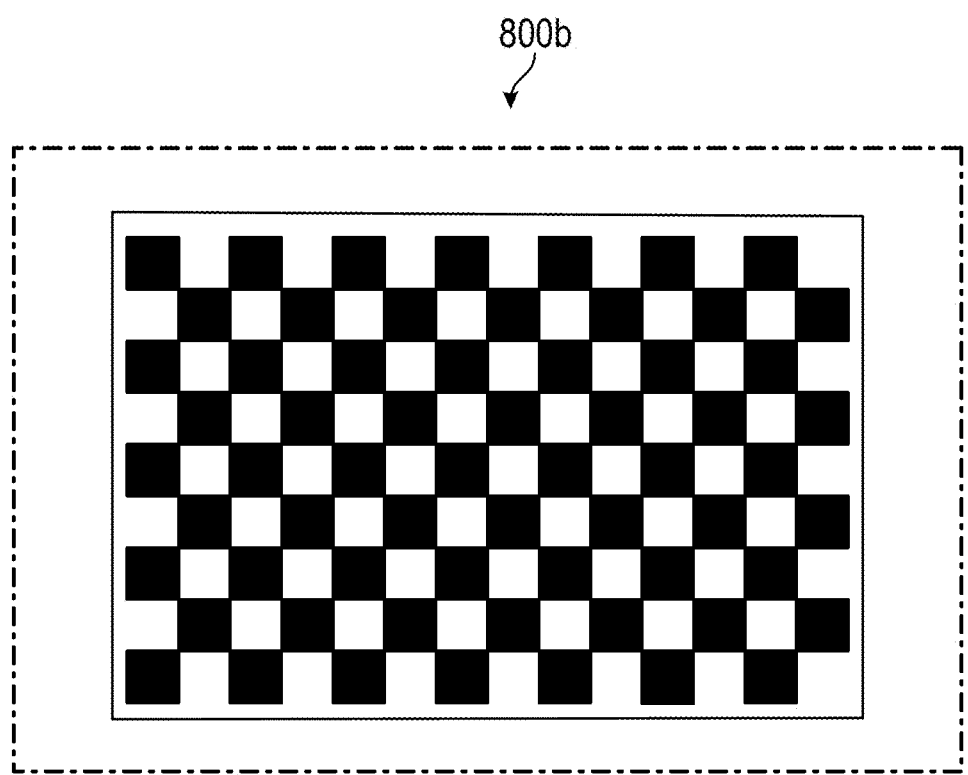
Figure 12:
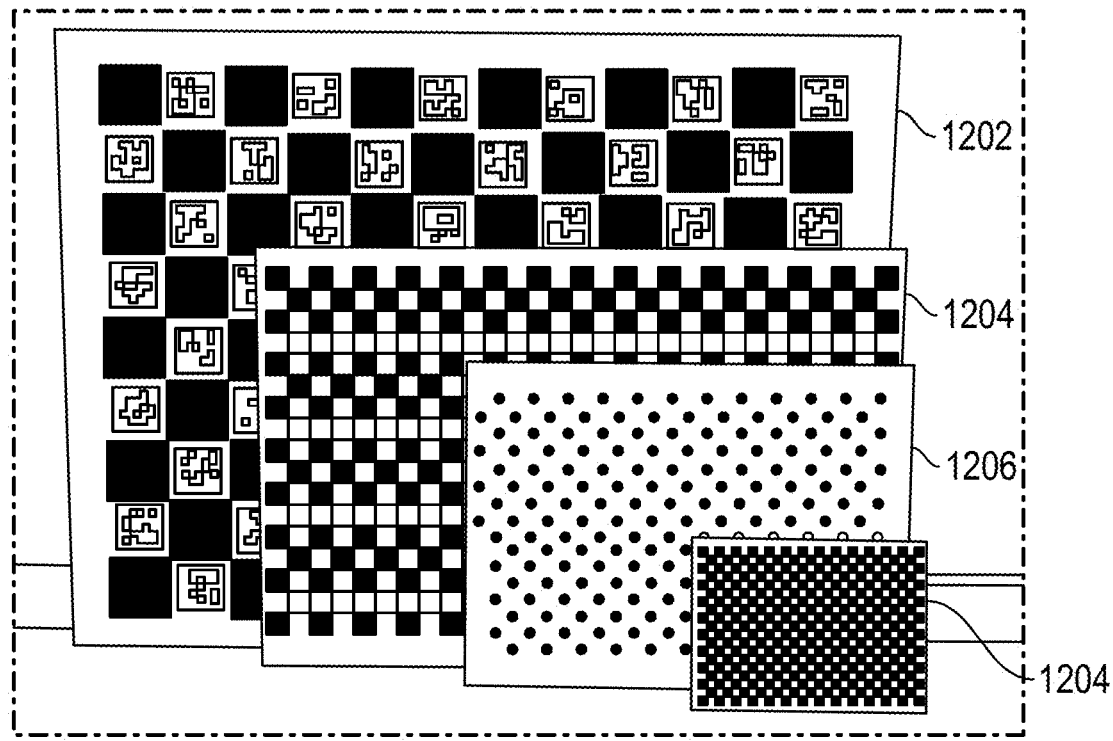
FIG. 12 illustrates example patterns and designs that can be used with a three-dimensional calibration target.

FIGS. 8A and 8B provide example surface textures or patterns that can be included on some embodiments of calibration targets. FIG. 8A illustrates an example dot-based pattern 800a, and FIG. 8B illustrates an example grid- or checkerboard-based patter 800b. These visual patterns can be configured to be detectable by camera or vision-based sensors as part of a calibration course as described above. Other visual patterns may also be used, for example, as shown in FIG. 12, described below.

Figure 9:
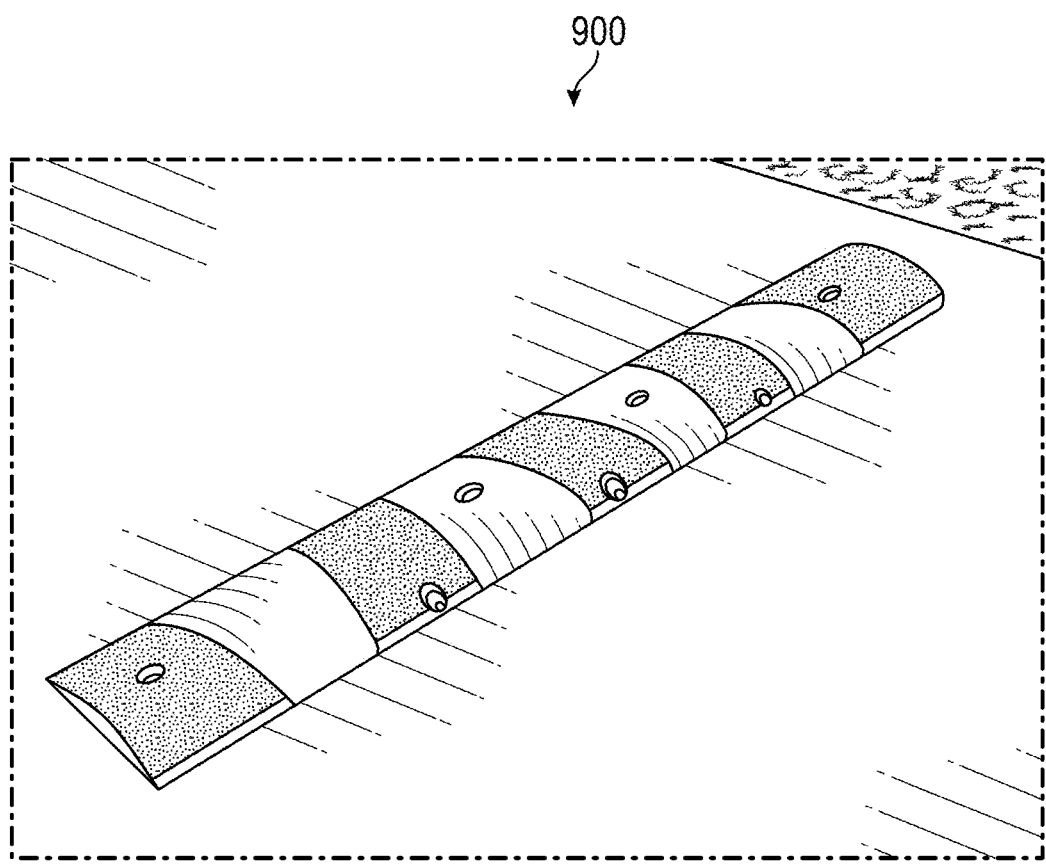
FIG. 9 illustrates an example course obstacle, configured as a speed bump, that can be included in some embodiments of calibration courses.

FIG. 9 illustrates an example course obstacle configured as a speed bump 900. Such an obstacle can be used in a calibration course, for example, as described with reference to FIG. 5, to adjust the orientation between the vehicle and its sensors and a calibration target. Other shapes and configurations for targets are also possible.

Figure 10A:
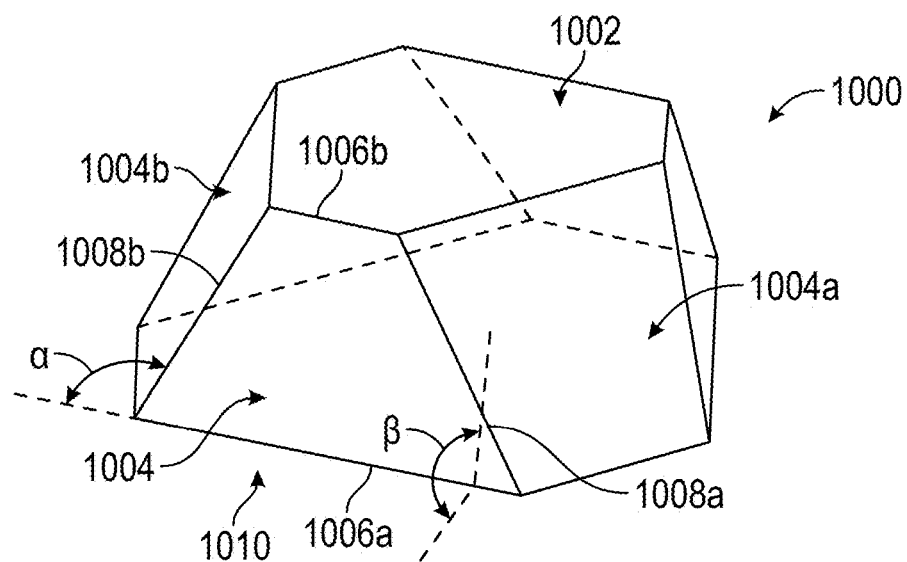
FIG. 10A is a perspective view of an embodiment of a three-dimensional calibration target.

FIG. 10A shows an example embodiment of a calibration target 1000. The calibration target 1000 may be the same or similar to one or more of the calibration targets 504 described above with reference to FIG. 5. In some embodiments, the calibration target 1000 can be used with LiDAR and LiDAR-camera fusion systems, although the calibration target can also be used with other sensor types, such as vision-based sensors and/or radar sensors.

The calibration target 1000 can be three-dimensional. In some embodiments, the calibration target 1000 can comprise an irregular or asymmetrical shape. As shown in the illustrated embodiment, the calibration target 1000 can have a top surface 1002 and side surfaces 1004. The calibration target 1000 can have four, five, six, seven, eight, or more side surfaces 1004. Each side surface 1004 can have a first edge 1006a that can define a portion of a bottom area 1010, a second edge 1006b that can be shared with the top surface 1002, a third edge 1008a that can be shared with a first adjacent side surface 1004a, and a fourth edge 1008b that can be shared with a second adjacent side surface 1004b. The surfaces 1002, 1004 can form a calibration target 1000 with a convex shape. The convex shape can provide the benefit that no portion of a surface will be covered or removed from sight when approaching a target. For example, there will be no shadowed or blocked edges. If a portion of a surface 1002, 1004 is visible, the entire surface 1002, 1004 can be visible.

In some embodiments, the side surfaces 1004 can have more or less than four edges 1006a, 1006b, 1008a, 1008b. For example, the side surfaces 1004 can have three, four, five six, or more edges. The top surface 1002 can have a number of edges corresponding to the number of side surfaces 1004 having edges 1006b that is shared with the top surface 1002. The bottom area 1010 can be an empty area defined by a perimeter formed by the edges 1006a. In some embodiments, the bottom area 1010 can be a surface, similar to any of the side surfaces 1004. The side surfaces 1004 and top surface 1002 can be planar, smooth, flush, even, or flat. If the bottom area 1010 is a bottom surface, the bottom surface can also be planar, smooth, flush, even, or flat. The use of planar surfaces can make the calibration targets easier to detect. In some embodiments, the calibration target 1000 can be hollow. In some embodiments, the calibration target 1000 can be solid.

A side surface 1004 and a horizontal plane, for example a plane formed by the bottom area 1010, a ground, a bottom surface, a support surface, etc., can form an angle $\alpha$. The angle formed by a side surface 1004 and the horizontal plane can be different from an angle $\beta$ formed by a first adjacent side surface 1004 and the same horizontal plane. The angle $\alpha$ can also be different than any angle formed by any side surface 1004 and the horizontal plane. For example, an angle between the horizontal plane and each of the side surfaces 1004 can be different. The differences between angles, for example, angle $\alpha$ and angle $\beta$, can be around 1°, 5°, 10°, 15°, 20°, or any value in-between. In some embodiments, the difference can be greater than 20°. The distinct and different angles can allow for the calibration target to determine which direction a vehicle is approaching from. Therefore, the orientation of the calibration target 1000 when in use can be important. The calibration target 1000 is capable of being secured to the support surface or ground in a manner to secure calibration target 1000 from moving due to external sources, such as weather.

Figure 10B:
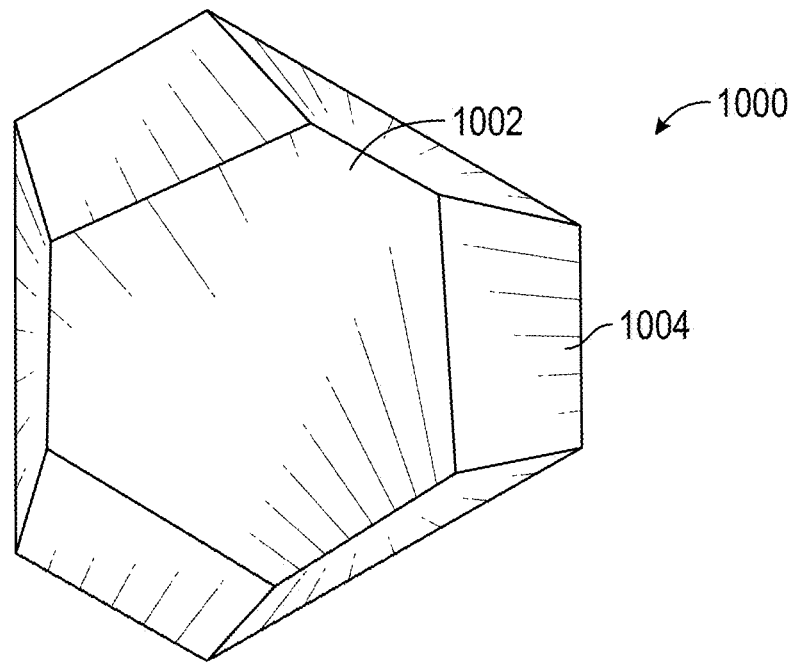
FIG. 10B is a top view of the three-dimensional calibration target of FIG. 10A.

The calibration target 1000 can be made from a uniform material. The use of a uniform material can improve LiDAR intensity calibration and validation. In some embodiments, the calibration target 1000 can be made of welded bars to form a skeleton of the calibration target 1000. The welded bars can be steel. The top surface 1002 and side surfaces 1004 can be plates that can be connected to the skeleton by any suitable means, for example, via hooks or screws. The surfaces 1002, 1004 can be made of aluminum in some embodiments. In some embodiments, a skeleton of welded bars cannot be used. For example, the top surface and side surfaces 1004 can be welded together or connected via connectors. The material choice can allow for the calibration target 1000 to be light in weight but also durable and/or weather resistant. Non-limiting examples of materials that can be used include durable plastic, coated woods, carbon fiber, and composite materials, FIG. 10B shows a top view of a calibration target 1000. The side surface 1004 can be angled relative to the top surface 1002. In some embodiments, the entirety of each surface 1002, 1004 can be visible from above, such that no portion of any surface 1002, 1004 is hidden or obstructed from view.

Figure 10C:
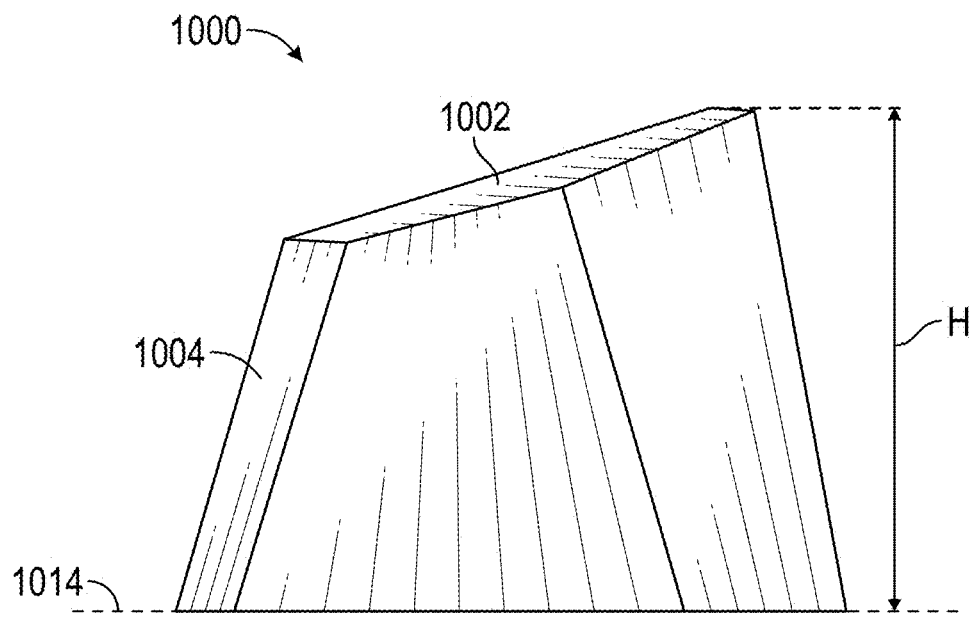
FIG. 10C is a side view of the three-dimensional calibration target of FIG. 10A.
Figure 10D:
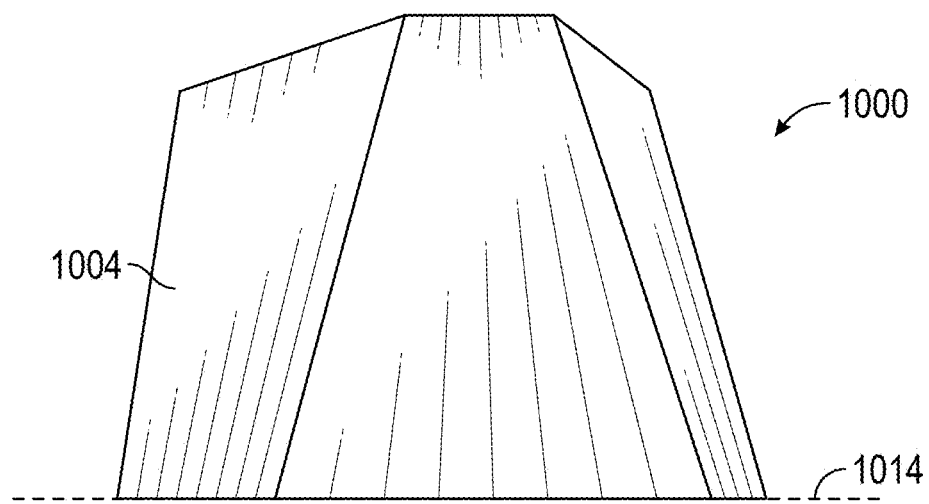
FIG. 10D is another side view of the three-dimensional calibration target of FIG. 10A.

FIGS. 10C and 10D show different side views of a calibration target 1000. As shown in both FIGS. 10C and 10D, all surface areas, whether a top surface 1002 or a side surface 1004, that are visible can be completely visible, meaning if a part of the surface 1002, 1004 is visible the entire surface 1002, 1004 is visible. In FIG. 10C, the calibration target 1000 is viewed from a location where the top surface 1002 can be visible and three side surfaces 1004 can be visible. The top surface 1002 and each of the three side surface 1004 can be fully visible. In other embodiments, the number of side surfaces 1004 visible can be one, two, three, four, five, or more. The top surface 1002 can be not parallel to a support surface 514, for example the ground or surface that the calibration target 1000 is positioned on. In FIG. 10D, the calibration target is viewed from a location where the top surface 1002 is not visible.

The height H of calibration target 1000 can be about 0.5 meters, 1 meter, 1.5 meter, 2 meters, 2.5 meters or any value in-between, as well as other values both larger and smaller. The size can be dependent on the LiDAR systems being used. For example, some LiDAR systems are designed to see farther distances and can interact with taller calibration target and some LiDAR systems are designed to see closer distances and can interact with a smaller calibration target. The overall size of the calibration target 1000 can be a balance to allow for use with a variety of distances of LiDAR systems. The position of a sensor or LiDAR system on a vehicle can also impact the size of the calibration target. In some embodiments, the height of at least one side surface 1004 can be different than the other side surfaces 1004. In some embodiments, the height of each side surface 1004 can be different.

Figure 11C:
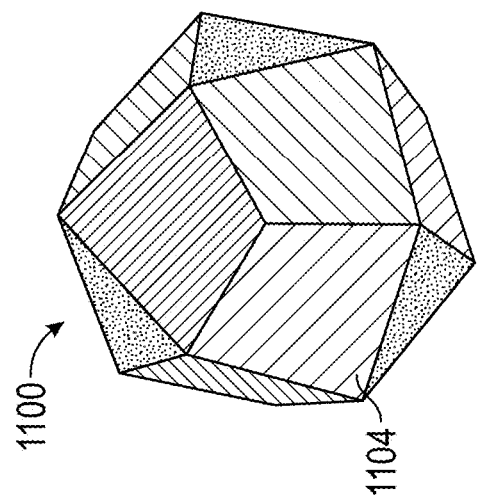
FIGS. 11A-11C are views of another embodiment of a three-dimensional calibration target.
Figure 11B:
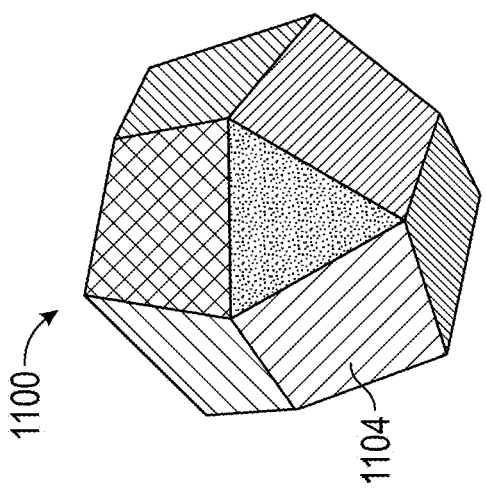
Figure 11A:
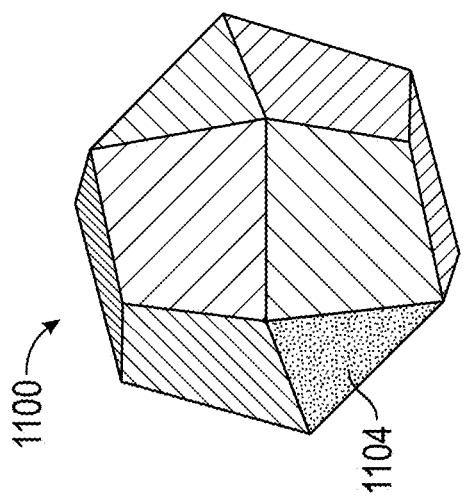

FIGS. 11A-11C show another embodiment of a calibration target 1100. The calibration target 1100 can have a generally irregular ball like shape. As shown, the side surface 1104 can have any number of sides. For example, three, four or more. The side surfaces 1104 can be any shape, dependent on the number of sides. The side surfaces 1104 can be connected at the edges, as described above to form a convex, asymmetrical, irregular shape. The calibration target, as shown in FIGS. 11A-11C, can be hollow or solid.

FIG. 12 shows patterns, designs, or materials that can be used with any of the calibration targets described above. Patterns that can be used include, but are not limited to, CharuCo 1202, checkerboard 1204, and circle gird 1206 patterns. The patterns 1202, 1204, 1206 can be connected to the surfaces (e.g., top surface 1002 or side surface 1004) by any suitable means. In some embodiments, hooks (not shown) can be used to connect the patterns. In some embodiments, all surfaces can have the same pattern. In some embodiments, at least one surface can have a different pattern than another surface. In some embodiments, no patterns may be used. In some embodiments, each surface can have a different pattern than any other surface. Any material can be used for the surface patterns or textures. In some embodiments, the surface patterns or textures are non-reflective. Non-limiting examples of surface patterns or textures include painted, matte plastic, matte plastic with colors, matte laminated surfaces, etc.

Use of such surface patterns or textures can allow the calibration targets to be used for calibrating vision-based sensors or cameras. For example the vision-based sensors or cameras can detect the surface patterns and use the information to calibrate the sensors. The surface patterns or textures can serve as camera targets and can assist in performing camera intrinsic calibration and/or camera extrinsic calibration. The calibration can be completed relative to other sensors.

Figure 13:
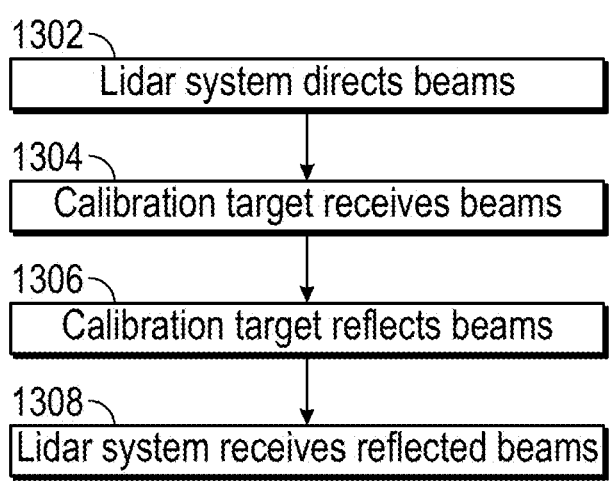
FIG. 13 is a flow chart illustrating an example method of using a LiDAR system with a three-dimensional calibration target.

FIG. 13 describes a method of using a LiDAR system with a calibration target. Starting at block 1302, a LiDAR system can direct at least one beam towards a calibration target. Moving to block 1304, the calibration target can receive the at least one beam. Moving to block 1306, the calibration target can reflect the at least one beam back to the LiDAR system. Moving to block 1308, the LiDAR system can receive the reflected at least one beam.

The calibration targets described throughout can be used in calibration rooms and drive-through calibration centers. Additionally, the calibration targets can be used for ground truth localization or mapping. The known position and dimensions of the calibration targets can be used to check or monitor the algorithms used for ground truth localization or mapping. Further, the calibration targets can be used as a road sign for vehicles with LiDAR systems or other systems that can be used with the calibration targets. For example, the calibration targets can be used at night when there is poor visibility, can be used as sign to indicate the entrance or exit of certain area, and can act as your typical street or road signs. In some embodiments, the calibration target can act as alert to turn on or off an autonomous mode for an autonomous vehicle.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A three-dimensional calibration target, comprising:
   a top surface, and
   at least four side surfaces,
   wherein a particular side surface has a first edge defining a portion of a bottom area, a second edge shared with the top surface, a third edge shared with a first adjacent side surface, and a fourth edge shared with a second adjacent side surface,
   wherein an angle difference between the particular side surface and a horizontal plane is different from an angle difference between the horizontal plane and the first adjacent side surface, and
   wherein an angle difference between the horizontal plane and each of the side surfaces is different.

2. The calibration target of claim 1, further comprising a bottom area defined by a perimeter configured to support the calibration target relative to a support surface.

3. The calibration target of claim 1, wherein the top surface is not parallel to a support surface.

4. The calibration target of claim 1, wherein the side surfaces are planar.

5. The calibration target of claim 1, wherein the angle difference between the particular side surface and the horizontal plane is different from an angle difference between the horizontal plane and the second adjacent side surface.

6. The calibration target of claim 1, wherein the at least four side surfaces comprises at least six side surfaces.

7. The calibration target of claim 1, wherein the calibration target is configured to reflect a plurality of beams from a lidar system.

8. The calibration target of claim 7, wherein the lidar system is configured to use the plurality of beams for calibration.

9. The calibration target of claim 1, wherein the calibration target forms a convex shape.

10. The calibration target of claim 1, wherein a height of the particular side surface is different than a height of the first adjacent side surface and a height of the second adjacent side surface.

11. The calibration target of claim 1, wherein the top surface is planar and is sloped relative to ground.

12. An irregularly shaped, convex, asymmetrical, three-dimensional, lidar calibration target comprising:
   a top surface angled relative to a bottom area; and
   a plurality of side surfaces each positioned at a different angle relative to a horizontal plane,
   wherein each of the plurality of side surfaces are coupled to the top surface and at least two adjacent side surfaces,
   wherein the plurality of side surfaces are configured to reflect beams from a lidar system, and
   wherein the top surface is not parallel to a support surface.

13. The calibration target of claim 12, further comprising a bottom area defined by a perimeter configured to support the calibration target relative to a support surface.

14. The calibration target of claim 12, wherein the side surfaces are planar.

15. The calibration target of claim 12, wherein the calibration target forms a convex shape.

16. The calibration target of claim 12, wherein a height of a particular side surface is different than a height of a first adjacent side surface and a height of a second adjacent side surface.

17. A system for calibrating a sensor of a vehicle, the system comprising:
   at least one processor configured to:
      emit, with a LiDAR system, at least one beam;
      receive, with at least one sensor of the LiDAR system, sensor data determined based on the at least one beam reflected from at least one surface of an irregularly shaped, convex, asymmetrical, three-dimensional lidar calibration target, wherein the calibration target comprises:
         a top surface angled relative to a bottom area; and
         a plurality of side surfaces each positioned at a different angle relative to a horizontal plane,
         wherein each of the plurality of side surfaces are coupled to the top surface and at least two adjacent side surfaces,
         wherein the plurality of side surfaces are configured to reflect beams from a lidar system, and
         wherein the top surface is not parallel to a support surface, and
      calibrate the at least one sensor of the LiDAR system based on the sensor data.

* * * * *